US011948714B2

(12) United States Patent
Ishida et al.

(10) Patent No.: US 11,948,714 B2
(45) Date of Patent: Apr. 2, 2024

(54) SOFT MAGNETIC MATERIAL AND GREEN COMPACT

(71) Applicant: Murata Manufacturing Co., Ltd., Kyoto-fu (JP)

(72) Inventors: Yuya Ishida, Nagaokakyo (JP); Katsutoshi Uji, Nagaokakyo (JP); Hironobu Kubota, Nagaokakyo (JP); Tomoya Ooshima, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 495 days.

(21) Appl. No.: 17/119,622

(22) Filed: Dec. 11, 2020

(65) Prior Publication Data

US 2021/0183548 A1 Jun. 17, 2021

(30) Foreign Application Priority Data

Dec. 12, 2019 (JP) ................................ 2019-224678
Sep. 29, 2020 (JP) ................................ 2020-163773

(51) Int. Cl.
*H01F 1/22* (2006.01)
*H01F 1/147* (2006.01)

(52) U.S. Cl.
CPC ........... *H01F 1/22* (2013.01); *H01F 1/14741* (2013.01); *H01F 1/14791* (2013.01)

(58) Field of Classification Search
None
See application file for complete search history.

(56) References Cited

U.S. PATENT DOCUMENTS

2017/0283920 A1* 10/2017 Lin ........................ C22C 45/02

FOREIGN PATENT DOCUMENTS

| | | | |
|---|---|---|---|
| CA | 2505381 | A1 * | 7/2004 |
| JP | H09125111 | A | 5/1997 |
| JP | 2006179621 | A | 7/2006 |
| JP | 2015095598 | A | 5/2015 |
| JP | 2018170451 | A | 11/2018 |
| JP | 2019182951 | A * | 10/2019 |
| WO | 2004/056508 | A1 | 7/2004 |

OTHER PUBLICATIONS

Machine translation JP2019182951A (Year: 2023).*
KBM Data Sheet, ShinEtsu, available online at https://www.shinetsusilicones.com/fluid.aspx?ID=KBM-303 (Year: 2023).*

* cited by examiner

*Primary Examiner* — Alexandre F Ferre
(74) *Attorney, Agent, or Firm* — Studebaker & Brackett PC

(57) ABSTRACT

A soft magnetic material for soft magnetic particles with a high filling rate. The soft magnetic material contains first soft magnetic particles and second soft magnetic particles with a larger average particle size than the first soft magnetic particles. The first soft magnetic particles have an average particle size in the range of 0.5 to 10 μm, and the first soft magnetic particles have a nonpolar hydrocarbon group on their surfaces.

15 Claims, 3 Drawing Sheets

SOFT MAGNETIC MATERIAL AND GREEN COMPACT

CROSS-REFERENCE TO RELATED APPLICATIONS

This application claims benefit of priority to Japanese Patent Application No. 2020-163773, filed Sep. 29, 2020, and to Japanese Patent Application No. 2019-224678, filed Dec. 12, 2019, the entire contents of which are incorporated herein by reference.

BACKGROUND

Technical Field

The present disclosure relates to a soft magnetic material and a green compact of the soft magnetic material.

Background Art

In recent years, with a decrease in the size of electrical equipment and electronic components, smaller electronic components have been desired. Among others, coil components composed of a magnetic metal with good DC superposition characteristics can be smaller than ferrite coil components and have been widely used.

It is known that magnetic metal particles having a layer with high electrical resistance on the surface can be used to improve the magnetic characteristics of coil components. Japanese Unexamined Patent Application Publication No. 9-125111 discloses a magnetic material powder that is produced by adding a metal powder to a solution containing at least one metal alkoxide, uniformly dispersing the metal powder, adding distilled water to the solution to hydrolyze the metal alkoxide, making the hydroxide to be adsorbed on the surface, and filtering out, drying, and heating the metal powder.

When soft magnetic particles are used as a material for a magnetic portion of coil components, such as inductors, the relative permeability increases with the filling rate of the soft magnetic particles in the magnetic portion. The present inventors, however, have found that the filling rate of soft magnetic particles are difficult to improve.

SUMMARY

Accordingly, the present disclosure provides a soft magnetic material for soft magnetic particles with a high filling rate.

As a result of extensive studies, the present inventors have completed the present disclosure by finding that the filling rate of soft magnetic particles can be improved by using a soft magnetic material containing two or more types of soft magnetic particles and by controlling the average particle size and lubricity of the soft magnetic particles.

A first aspect of the present disclosure provides a soft magnetic material that contains first soft magnetic particles and second soft magnetic particles with a larger average particle size than the first soft magnetic particles. The first soft magnetic particles have an average particle size in the range of 0.5 to 10 μm, and the first soft magnetic particles have a nonpolar hydrocarbon group on their surfaces.

A second aspect of the present disclosure provides a soft magnetic material that contains first soft magnetic particles and second soft magnetic particles with a larger average particle size than the first soft magnetic particles. The first soft magnetic particles have an average particle size in the range of 0.5 to 10 μm, and the first soft magnetic particles have a hydrocarbon group with a straight-chain moiety having 6 or more carbon atoms on their surfaces.

A third aspect of the present disclosure provides a soft magnetic material that contains first soft magnetic particles and second soft magnetic particles with a larger average particle size than the first soft magnetic particles. The first soft magnetic particles have an average particle size in the range of 0.5 to 10 μm, and the first soft magnetic particles have a lubricity value of 2.0%/mm or more, the lubricity value being represented by the following formula.

$$\text{Percentage of stress relaxation (\%)}=(\text{Maximum indentation load}-\text{Indentation load at the beginning of lateral sliding})/\text{Maximum indentation load}\times 100$$

$$\text{Lubricity (\%/mm)}=\text{Percentage of stress relaxation (\%)}/\text{Final powder layer thickness (mm)} \quad \text{[Math. 1]}$$

Another aspect of the present disclosure provides a green compact containing the soft magnetic material.

A soft magnetic material according to one aspect of the present disclosure can be used to produce soft magnetic particles with a high filling rate. Another aspect of the present disclosure provides a green compact containing soft magnetic particles at a relatively high filling rate.

Other features, elements, characteristics and advantages of the present disclosure will become more apparent from the following detailed description of preferred embodiments of the present disclosure with reference to the attached drawings.

DETAILED DESCRIPTION

Figure 1:
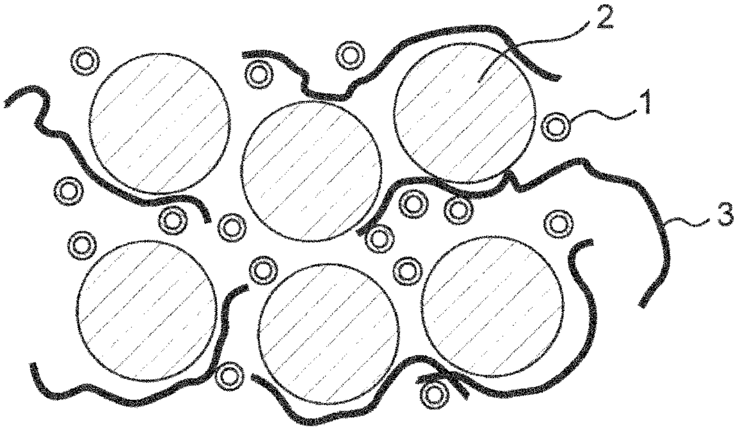
FIG. 1 is a schematic view of a soft magnetic material according to an embodiment of the present disclosure before press forming.

Embodiments of the present disclosure are described in detail below with reference to the accompanying drawings. These embodiments are provided for illustration only, and the present disclosure is not limited to these embodiments.

[Soft Magnetic Material]

A soft magnetic material according to an embodiment of the present disclosure contains at least first soft magnetic particles and second soft magnetic particles. The first soft magnetic particles and the second soft magnetic particles have different average particle sizes. More specifically, the soft magnetic material contains the first soft magnetic particles and the second soft magnetic particles with a larger average particle size than the first soft magnetic particles. The term “average particle size”, as used herein, refers to the median size on a volume basis.

Average particle size (median size) determined in a compact:

A compact is polished to expose a cross section of a soft magnetic particle. An electron microscope image of the cross section is captured and analyzed by image analysis software (for example, A-ZO KUN (registered trademark) from Asahi Kasei Engineering Corporation), thereby determining the equivalent circular diameter of the cross section of the soft magnetic particle. On the assumption that each soft magnetic particle is a sphere with the equivalent circular diameter, the volume of each sphere is determined. The average particle size is determined as the median of the volume distribution.

In an embodiment of the present disclosure, particles of the soft magnetic material are preferably magnetic metal particles. In other words, both the first soft magnetic particles and the second soft magnetic particles are preferably magnetic metal particles. In magnetic metal particles, the soft magnetic material can easily have suitable magnetic characteristics. As described later, the soft magnetic material may further contain additional soft magnetic particles (third soft magnetic particles, fourth soft magnetic particles, etc.) in addition to the first soft magnetic particles and the second soft magnetic particles. The first soft magnetic particles, second soft magnetic particles, and optional soft magnetic particles in the soft magnetic material are also collectively referred to as “soft magnetic particles”.

The first soft magnetic particles have an average particle size in the range of 0.5 to 10 μm. The soft magnetic particles tend to have a high filling rate when the first soft magnetic particles have an average particle size in the above range and the second soft magnetic particles have a larger average particle size than the first soft magnetic particles.

The first soft magnetic particles have a nonpolar hydrocarbon group. More specifically, the first soft magnetic particles have a nonpolar hydrocarbon group on their surfaces. The term “nonpolar hydrocarbon group”, as used herein, refers broadly to a hydrocarbon group with a small imbalance in electric charge distribution and refers narrowly to a hydrocarbon group with a straight-chain moiety having 6 or more carbon atoms. The “straight-chain moiety having 6 or more carbon atoms” may have an unsaturated bond and preferably has only saturated bonds. The “nonpolar hydrocarbon group” may have a branched carbon chain as a side chain and/or may have a polar group, provided that the nonpolar hydrocarbon group has a straight-chain moiety having 6 or more carbon atoms. Even having a polar group, the “nonpolar hydrocarbon group”, which has a straight-chain moiety having 6 or more carbon atoms, has a small imbalance in electric charge distribution as a whole. For example, the “nonpolar hydrocarbon group” may be a chain hydrocarbon group, such as an alkyl group represented by $C_nH_{2n+1}$. The “nonpolar hydrocarbon group” may have a cyclic hydrocarbon group, such as an aryl group or a phenyl group. The “cyclic hydrocarbon group” may be an alicyclic hydrocarbon group or an aromatic hydrocarbon group.

As can be seen from the above description, in the soft magnetic material according to the present embodiment of the present disclosure, when viewed from another perspective, the first soft magnetic particles may have a hydrocarbon group with a straight-chain moiety having 6 or more carbon atoms on the surface.

Figure 2:
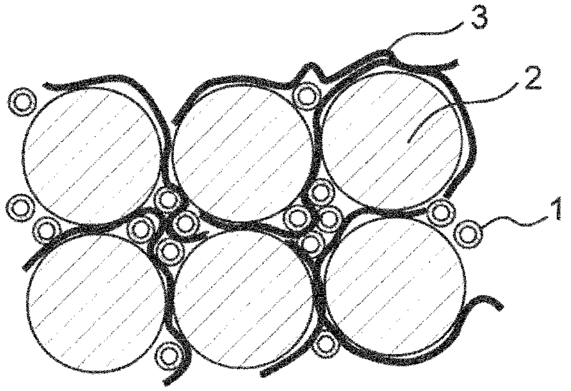
FIG. 2 is a schematic view of a soft magnetic material according to an embodiment of the present disclosure after press forming.

The first soft magnetic particles are small particles with a smaller average particle size than the second soft magnetic particles. The present inventors have found that the filling rate of soft magnetic particles in a soft magnetic material containing two or more types of soft magnetic particles with different average particle sizes can be improved by providing a nonpolar hydrocarbon group or a hydrocarbon group with a straight-chain moiety having 6 or more carbon atoms on the surfaces of the small particles (the first soft magnetic particles). Although not wishing to be bound by any particular theory, it is assumed that the filling rate of the soft magnetic material is improved by the following mechanism. A coil component may be produced from the soft magnetic material according to the present embodiment by press forming the soft magnetic material containing first soft magnetic particles 1 and second soft magnetic particles 2 together with a binder 3 (a thermosetting resin, etc.), as illustrated in FIG. 1. In this case, a nonpolar hydrocarbon group or a hydrocarbon group with a straight-chain moiety having 6 or more carbon atoms, if present on the surface of the first soft magnetic particles 1 (small particles), can weaken a hydrogen bond and/or dipole interaction between the first soft magnetic particles 1 and a polar group (for example, an epoxy group and/or a hydroxy group) of the binder 3 and can thereby improve the flowability of the soft magnetic particles in press forming. Thus, the flowable small particles (the first soft magnetic particles 1) can easily enter the space between the second soft magnetic particles 2 (large particles) (FIG. 2). Such a mechanism can improve the filling rate of the soft magnetic particles as compared with the case where the first soft magnetic particles 1 do not have a nonpolar hydrocarbon group or a hydrocarbon group with a straight-chain moiety having 6 or more carbon atoms. An improvement in the filling rate of the soft magnetic particles can increase the density of the soft magnetic material and can consequently increase the relative permeability of the soft magnetic material.

In contrast, when the first soft magnetic particles 1 do not have a nonpolar hydrocarbon group or a hydrocarbon group with a straight-chain moiety having 6 or more carbon atoms, the first soft magnetic particles 1 have a polar surface, have a strong hydrogen bond and/or strong dipole interaction with the binder 3 in press forming, and are easily bound to the binder 3. This makes it difficult to increase the filling rate of the soft magnetic particles.

An improvement in the flowability of the first soft magnetic particles due to a nonpolar hydrocarbon group or a hydrocarbon group with a straight-chain moiety having 6 or more carbon atoms on the surface of the first soft magnetic particles can be evaluated in terms of the lubricity of the first soft magnetic particles. The first soft magnetic particles with higher lubricity have higher flowability and can consequently result in the soft magnetic particles with a higher filling rate. In the soft magnetic material according to the present embodiment, the first soft magnetic particles have a lubricity value of 2.0%/mm or more, the lubricity value being represented by the following formula.

Percentage of stress relaxation (%)=(Maximum indentation load−Indentation load at the beginning of lateral sliding)/Maximum indentation load×100

Lubricity (%/mm)=Percentage of stress relaxation (%)/Final powder layer thickness (mm) [Math. 2]

Figure 3:
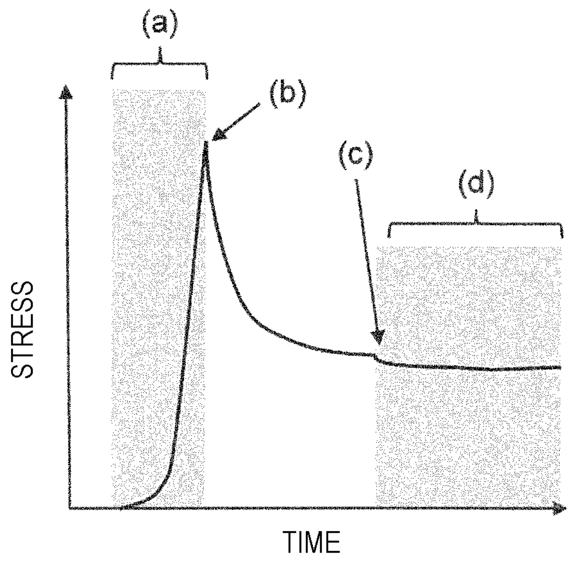
FIG. 3 is a graph of stress measurement.

The first soft magnetic particles preferably have a lubricity value in the range of 2.5%/mm to 5.0%/mm. The “lubricity” can be determined according to JIS-Z 8835. More specifically, the lubricity can be measured with a lower cell direct driven single shear test apparatus (a powder layer shear force measuring apparatus NS-S500 manufactured by Nano Seeds Corporation) through the following procedures. The inner diameter of an upper cell (ring) and a lower cell (base) is set to 15 mm, and the gap (clearance) between the upper cell and the lower cell is set to 0.2 mm. To measure the thickness of a powder layer with a laser sensor, a lid is placed on the upper and lower cells to set the zero point before a powder is mounted. The upper and lower cells are uniformly filled with 10 g of a powder sample in total. The lid is gently placed on the upper and lower cells. An indentation load of 150 N is applied to the upper and lower cells with a vertical servomotor. The position of a load cell of the vertical servomotor is fixed at the point in time when an indentation load of 150 N is applied to the upper and lower cells with the vertical servomotor. The indentation speed is set to 0.2 mm/s. Lateral sliding is started 100 seconds after the position of the load cell of the vertical servomotor is fixed. In other words, the delay in the start of lateral sliding is set to 100 seconds. After lateral sliding is started by the operation of a horizontal servomotor, the pressure is measured every 0.1 seconds. The lateral sliding speed is set to 5 μm/s. At least 50 measurements are continuously performed in each sample during the operation of the horizontal servomotor. The measurements are stopped when the coefficient of variation (CV) of the measured values reaches 0.4% or less. The thickness of a final pressed powder layer (the final powder layer thickness) is measured with a laser sensor. FIG. 3 shows data thus measured. In the graph of FIG. 3, the "stress" on the vertical axis refers to a measured bottom load (a load applied to a load cell on the bottom side), (a) indicates the operating time of the vertical servomotor, (b) indicates the maximum indentation load, (c) indicates the indentation load at the beginning of lateral sliding, and (d) indicates the operating time of the horizontal servomotor.

The lubricity can be determined using the above formula from the measured maximum indentation load (detected by the load cell on the bottom side), the indentation load at the beginning of lateral sliding, and the final powder layer thickness.

The components of the soft magnetic material are described in detail below.

First Soft Magnetic Particles

The first soft magnetic particles have the smallest average particle size (small particles) among the soft magnetic particles in the soft magnetic material. The first soft magnetic particles in the soft magnetic material preferably constitute 5% to 30% by weight of the total weight of the soft magnetic particles. A small particle (first soft magnetic particle) content of the soft magnetic material in the above range tends to result in the soft magnetic particles with a higher filling rate. The first soft magnetic particles in the soft magnetic material more preferably constitute 10% to 28% by weight, still more preferably 15% to 25% by weight, of the total weight of the soft magnetic particles.

The first soft magnetic particles have an average particle size in the range of 0.5 to 10 μm, preferably 0.7 to 7 μm, more preferably 1 to 5 μm. The first soft magnetic particles with an average particle size of 0.5 μm or more generate less heat of oxidation in the atmosphere. The first soft magnetic particles with an average particle size of 10 μm or less can result in the soft magnetic particles with a high filling rate.

The first soft magnetic particles may be known Fe-based magnetic metal particles, for example, at least one type of magnetic metal particles selected from the group consisting of Fe, FeNi alloys, FeCo alloys, FeSi alloys, FeSiCr alloys, FeSiAl alloys, and FeSiBCr alloys. The surface of the first soft magnetic particles may be subjected to insulation treatment. For example, the first soft magnetic particles may have an insulating film on the surface. For example, the insulating film may be at least one insulating film selected from the group consisting of inorganic glass films, organic polymer films, organic-inorganic hybrid films, and inorganic insulating films formed by a sol-gel reaction of a metal alkoxide.

The first soft magnetic particles have a nonpolar hydrocarbon group or a hydrocarbon group with a straight-chain moiety having 6 or more carbon atoms on the surface. More specifically, the nonpolar hydrocarbon group or the hydrocarbon group with a straight-chain moiety having 6 or more carbon atoms may be a chain saturated hydrocarbon group or an alkyl group, for example, at least one hydrocarbon group selected from the group consisting of a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, and an octadecyl group. The nonpolar hydrocarbon group or the hydrocarbon group with a straight-chain moiety having 6 or more carbon atoms may be any one of primary alkyl groups, secondary alkyl groups, and tertiary alkyl groups. The nonpolar hydrocarbon group or the hydrocarbon group with a straight-chain moiety having 6 or more carbon atoms more preferably has a straight-chain moiety having 8 or more carbon atoms. The upper limit of the number of carbon atoms in the hydrocarbon group may be, but is not limited to, 30, 25, or 20.

Second Soft Magnetic Particles

The second soft magnetic particles have a larger average particle size (large particles) than the first soft magnetic particles. The second soft magnetic particles in the soft magnetic material preferably constitute 70% to 95% by weight of the total weight of the first soft magnetic particles and the second soft magnetic particles.

The second soft magnetic particles preferably have an average particle size in the range of 20 to 50 μm. In other words, the soft magnetic particles (large particles) other than the first soft magnetic particles (small particles) have an average particle size in the range of 20 to 50 μm. The large particles with an average particle size of 20 μm or more tend to result in the soft magnetic particles with a higher filling rate. The second soft magnetic particles with an average particle size of 50 μm or less can decrease the eddy current loss. The second soft magnetic particles more preferably have an average particle size in the range of 23 to 45 μm, still more preferably 25 to 40 μm.

The second soft magnetic particles may be known Fe-based magnetic metal particles, for example, at least one type of magnetic metal particles selected from the group consisting of Fe, FeNi alloys, FeCo alloys, FeSi alloys, FeSiCr alloys, FeSiAl alloys, and FeSiBCr alloys. The composition of the second soft magnetic particles may be the same as the composition of the first soft magnetic particles but is preferably different from the composition of the first soft magnetic particles. The surface of the second soft magnetic particles may be subjected to insulation treatment. For example, the second soft magnetic particles may have an insulating film on the surface. For example, the insulating film may be at least one insulating film selected from the group consisting of inorganic glass films, organic polymer films, organic-inorganic hybrid films, and inorganic insulating films formed by a sol-gel reaction of a metal alkoxide.

The second soft magnetic particles preferably have a lubricity value of less than 2.0%/mm. More specifically, the second soft magnetic particles preferably have a lubricity value of less than 2.0%/mm, the lubricity value being represented by the following formula.

Percentage of stress relaxation (%)=(Maximum indentation load−Indentation load at the beginning of lateral sliding)/Maximum indentation load×100

Lubricity (%/mm)=Percentage of stress relaxation (%)/Final powder layer thickness (mm) [Math. 3]

As in the first soft magnetic particles, the "lubricity" can be determined according to JIS-Z 8835 by the method described for the first soft magnetic particles.

Soft magnetic particles other than the first soft magnetic particles (small particles), particularly the second soft magnetic particles (large particles), preferably have a lubricity value of less than 2.0%/mm. The second soft magnetic particles more preferably have a lubricity value in the range of 0.5%/mm to 1.8%/mm. The second soft magnetic particles with a lubricity value of less than 2.0%/mm, preferably 1.8%/mm or less, tend to result in the soft magnetic particles with a higher filling rate. Furthermore, the second soft magnetic particles with a lubricity value of 0.5%/mm or more tend to result in the soft magnetic particles with a higher filling rate.

Additional Soft Magnetic Particles

The soft magnetic material according to the present embodiment may further contain at least one type of additional soft magnetic particles (magnetic metal particles, such as third soft magnetic particles and/or fourth soft magnetic particles) in addition to the first soft magnetic particles and the second soft magnetic particles. The additional soft magnetic particles preferably have a larger average particle size than the first soft magnetic particles. In other words, the first soft magnetic particles preferably have the smallest average particle size among the soft magnetic particles in the soft magnetic material. The additional soft magnetic particles more preferably have an average particle size in the range of 20 to 50 μm. The additional soft magnetic particles with an average particle size in the above range tend to result in the soft magnetic particles with a higher filling rate. The additional soft magnetic particles preferably have a lubricity value of less than 2.0%/mm, more preferably 0.5%/mm to 1.8%/mm. The additional soft magnetic particles with a lubricity value in the above range tend to result in the soft magnetic particles with a higher filling rate. In the presence of additional soft magnetic particles, for convenience, soft magnetic particles with the largest average particle size among particles other than the first soft magnetic particles can be considered to be the second soft magnetic particles.

Binder

The soft magnetic material preferably further contains a binder. In the soft magnetic material containing a binder, the soft magnetic particles can be bound together with the binder and can have a further improved filling rate. The binder preferably has a polar group. When the binder has a polar group, the soft magnetic material can be expected to have improved strength.

The binder may be a thermosetting resin, such as an epoxy resin, a phenolic resin, and/or a silicon resin. In particular, the binder composed of an epoxy resin can provide the soft magnetic material with good electrical insulating properties and/or high mechanical strength. Alternatively, the binder may be a thermoplastic resin, such as polyamideimide, poly(phenylene sulfide), and/or a liquid crystal polymer.

The binder content of the soft magnetic material preferably ranges from 0.5% to 5% by weight, more preferably 1% to 4% by weight, still more preferably 1.5% to 3.5% by weight, of the total weight of the soft magnetic material.

[Method for Producing Soft Magnetic Material]

A method for producing a soft magnetic material according to an embodiment of the present disclosure is described below. The method described below is only an example, and a method for producing a soft magnetic material according to the present disclosure is not limited to this method.

First, first soft magnetic particles are prepared. The composition and average particle size of the first soft magnetic particles are described above in detail. The surface of the first soft magnetic particles may be subjected to insulation treatment. For example, the first soft magnetic particles may have an insulating film on the surface. For example, the insulating film may be at least one insulating film selected from the group consisting of inorganic glass films, organic polymer films, organic-inorganic hybrid films, and inorganic insulating films formed by a sol-gel reaction of a metal alkoxide. The average particle size of the first soft magnetic particles subjected to insulation treatment can be the average particle size of the soft magnetic particles including the insulating film. The average particle size of the soft magnetic particles is not substantially changed by surface treatment described later.

Second, the first soft magnetic particles are subjected to surface treatment to provide a nonpolar hydrocarbon group or a hydrocarbon group with a straight-chain moiety having 6 or more carbon atoms on the surface. A surface-treating agent for the surface treatment of the first soft magnetic particles can be a metal alkoxide, for example. The surface-treating agent may be a metal alkoxide alone or a combination of two or more metal alkoxides. The metal alkoxide in the present embodiment can be represented by the chemical formula $R'\text{-}M(\text{—}OR)_{n-1}$. In the chemical formula, n denotes the oxidation number of the metal species M in the metal alkoxide. The metal species M in the metal alkoxide is preferably at least one selected from the group consisting of Li, Na, Mg, Al, Si, K, Ca, Ti, Cu, Sr, Y, Zr, Ba, Ce, Ta, and Bi. The alkoxy group OR in the metal alkoxide may be any alkoxy group, such as a methoxy group, an ethoxy group, and/or a propoxy group. The nonpolar hydrocarbon group R' or the hydrocarbon group R' with a straight-chain moiety having 6 or more carbon atoms may be a chain saturated hydrocarbon group or an alkyl group, for example, at least one hydrocarbon group selected from the group consisting of a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, and an octadecyl group. The nonpolar hydrocarbon group R' may be a primary alkyl group, a secondary alkyl group, or a tertiary alkyl group. In an embodiment of the present disclosure, the nonpolar hydrocarbon group R' may have a straight-chain moiety having 6 or more carbon atoms, preferably a straight-chain moiety having 8 or more carbon atoms.

The first soft magnetic particles may be subjected to wet surface treatment. For example, the first soft magnetic particles, a metal alkoxide serving as a surface-treating agent, and water serving as a solvent are mixed to prepare a slurry. The metal alkoxide in the slurry is hydrolyzed and produces a nonpolar hydrocarbon group or a hydrocarbon group with a straight-chain moiety having 6 or more carbon atoms on the surface of the first soft magnetic particles. The slurry can be dried to produce surface-treated first soft magnetic particles. The solvent may further contain an organic compound, such as an alcohol, and/or an inorganic compound, such as ammonia.

Alternatively, instead of the metal alkoxide, a silane coupling agent ($R'\text{—}Si(OR)_3$), a carboxylic acid ($R'\text{—}COOH$), a phosphate ($R'\text{—}OPO(OH)_2$), a sulfonic acid ($R'\text{—}SO_3H$), or a thiol ($R'\text{—}SH$) may be used as a surface-treating agent. The alkoxy group OR and the hydrocarbon group R' in the surface-treating agent may be those described above.

Figure 4:
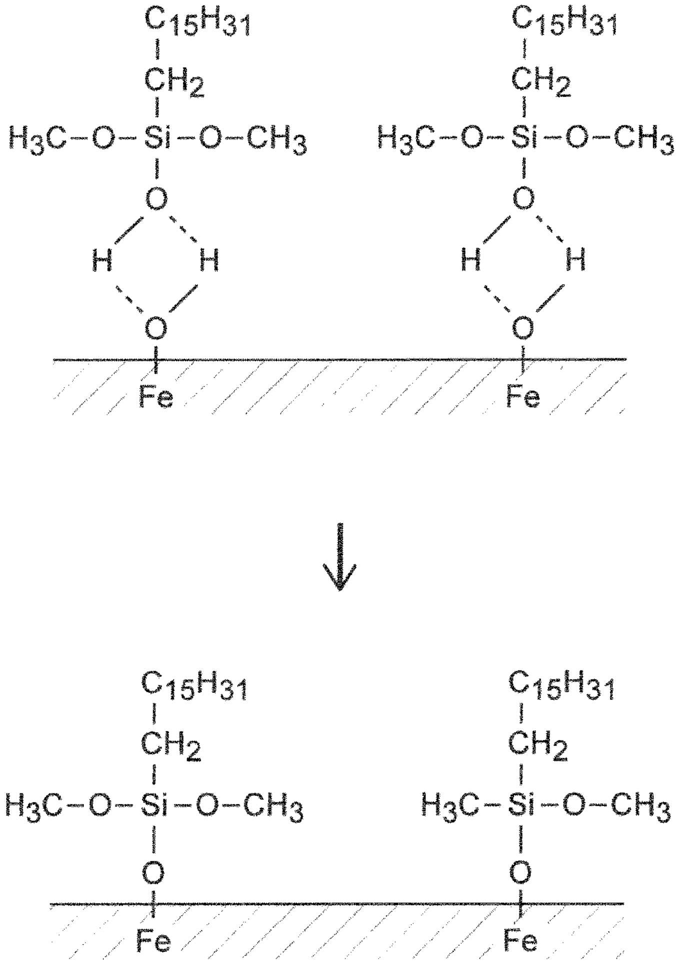
FIG. 4 is a schematic view of a surface treatment reaction mechanism when a silane coupling agent is used as a surface-treating agent.

FIG. 4 illustrates an example of a surface treatment reaction mechanism when a silane coupling agent is used as a surface-treating agent. In the example illustrated in FIG. 4, the silane coupling agent is hexadecyltrimethoxysilane (RO denotes a methoxy group, and R' denotes a hexadecyl group (the number of carbon atoms in the straight-chain moiety: 16)). As illustrated in FIG. 4, hexadecyltrimethoxysilane (HDTMS) after hydrolysis forms a hydrogen bond with a hydroxy group on the surface of the first soft magnetic particles. A dehydration reaction of the hydrogen bond can then produce a nonpolar hydrocarbon group or a hydrocarbon group with a straight-chain moiety having 6 or more carbon atoms on the surface of the first soft magnetic particles.

When an acid, such as a carboxylic acid and/or a sulfonic acid, is used as a surface-treating agent, an acid-base reaction between the acid and a base on the surface of the first soft magnetic particles can produce a nonpolar hydrocarbon group on the surface of the first soft magnetic particles. When a thiol is used as a surface-treating agent, a reaction between the thiol and a bare surface of the first soft magnetic particles can produce a nonpolar hydrocarbon group or a hydrocarbon group with a straight-chain moiety having 6 or more carbon atoms on the surface of the first soft magnetic particles. Alternatively, a hydrogen bond between a hydroxy group on the surface of the soft magnetic particles and a hydroxy group produced by the hydrolysis of a metal alkoxide can also produce a nonpolar hydrocarbon group or a hydrocarbon group with a straight-chain moiety having 6 or more carbon atoms on the surface of the first soft magnetic particles.

The first soft magnetic particles on which a nonpolar hydrocarbon group or a hydrocarbon group with a straight-chain moiety having 6 or more carbon atoms is produced by such surface treatment can be mixed with the second soft magnetic particles and optionally with a binder to produce the soft magnetic material according to the present embodiment.

The second soft magnetic particles in the soft magnetic material thus produced preferably constitute 70% to 95% by weight of the total weight of the first soft magnetic particles and the second soft magnetic particles. At a second soft magnetic particle content in the above range, in the formation of the soft magnetic material, the first soft magnetic particles with high lubricity are easily and effectively dispersed between the second soft magnetic particles without being excessively bound to a binder. Thus, a magnetic material (magnetic core) with high relative permeability can be easily produced.

[Green Compact]

The present disclosure also provides a green compact containing a soft magnetic material. Thus, the present disclosure also provides a green compact containing the first soft magnetic particles and the second soft magnetic particles.

A green compact can be produced by pressing a mixture of a soft magnetic material according to the present disclosure and a binder. More specifically, a green compact can be produced by pressing a mixture of the first soft magnetic particles 1, the second soft magnetic particles 2, and the binder 3 by an appropriate pressurizing means, such as pressing or molding. For pressurization, the mixture may be heated and hardened. In addition to or instead of the heating, the pressed mixture may be subjected to heat treatment and hardened. Soft magnetic particles may be bound together by necking in high-temperature heat treatment.

The first soft magnetic particles, the second soft magnetic particles, the binder, and the like for use in press forming are described above in connection with a soft magnetic material according to the present disclosure and are not described here to avoid duplication. The press forming process and the conditions therefor, such as pressure and temperature, may be known ones. Such a green compact can be used in various magnetic components, such as coil components. For example, such a green compact may be used for dust cores and element assemblies for electronic components having a coil conductor inside.

EXAMPLES

Soft magnetic materials according to Examples 1 to 17 and Comparative Examples 1 to 7 were produced through the following procedure. The lubricity of first soft magnetic particles and second soft magnetic particles, the density of each soft magnetic material, and the relative permeability of each soft magnetic material were measured in the soft magnetic materials according to the examples and comparative examples.

Example 1

Production of Soft Magnetic Material 10 g of 9% aqueous ammonia and 50 g of a carbonyl iron powder with an average particle size of 1.5 μm (without an insulating film on the surface) were stirred in 15 g of ethanol. 0.024 M of hexadecyltrimethoxysilane (the number of carbon atoms in the straight-chain moiety: 16) was weighed and added dropwise. After stirring, a slurry of a surface-treated metal powder was obtained. The surface-treated metal powder corresponds to first soft magnetic particles. The slurry was filtered, was washed with acetone, and was dried at 60° C. for 6 hours. Thus, a surface-treated metal powder was obtained. The term “M”, as used herein, refers to mol/l. The term “l”, as used herein, refers to the total volume of ethanol, aqueous ammonia, and hexadecyltrimethoxysilane.

The first soft magnetic particles were mixed with an FeSiCr alloy with an average particle size of 30 μm (without an insulating film on the surface), which corresponds to second soft magnetic particles, in a V-type mixer. The second soft magnetic particles constituted 80% by weight of the total weight of the first soft magnetic particles and the second soft magnetic particles. The mixture of the first soft magnetic particles and the second soft magnetic particles was mixed with an epoxy resin. Thus, a granulated powder was obtained as a soft magnetic material according to Example 1. The epoxy resin constituted 3% by weight of the total weight of the first soft magnetic particles, the second soft magnetic particles, and the epoxy resin.

Production of Toroidal Ring

The soft magnetic material was thermoformed in a mold at a pressure of 40 MPa and at a temperature of 185° C. for 100 seconds to cure the epoxy resin. Thus, a toroidal ring 8 mm in inner diameter, 13 mm in outer diameter, and 4 mm in thickness was obtained.

Identifying Nonpolar Hydrocarbon Group/Hydrocarbon Group with Straight-Chain Moiety Having 6 or More Carbon Atoms To identify a nonpolar hydrocarbon group on the surface of the first soft magnetic particles, the first soft magnetic particles after surface treatment were analyzed by X-ray photoelectron spectroscopy (XPS). The XPS analysis was performed with PHI 5000 VersaProbe III manufactured by ULVAC-PHI, Inc. The beam diameter was 100 μm. Although the soft magnetic particles could be fixed to a sample stage by any method, the soft magnetic particles were pressed and adhered to indium foil such that the surface properties of the soft magnetic particles were not changed by excessive loading. The soft magnetic particles were placed such that the indium foil was not exposed at the measuring point. The indium foil was then mounted on the sample stage. Alternatively, the soft magnetic particles may be adhered to a silicon-free tape, which is then mounted on the sample stage. A narrow scan spectrum of the first soft magnetic particles after surface treatment was obtained through the above procedure, and a C1s peak intensity was observed at 284.6 eV. A C1s peak intensity of 1500 c/s or more indicates that the first soft magnetic particles have a nonpolar hydrocarbon group or a hydrocarbon group with a straight-chain moiety having 6 or more carbon atoms on the surface. For the first soft magnetic particles after surface treatment, the Cis peak intensity is preferably 2000 c/s or more, more preferably 2500 c/s or more, still more preferably 3000 c/s or more.

In the first soft magnetic particles after surface treatment, a nonpolar hydrocarbon group or a hydrocarbon group with a straight-chain moiety having 6 or more carbon atoms on the surface can be identified by analyzing generated gases with a gas chromatography-mass spectrometer (GC-MS), for example, when the first soft magnetic particles are heated at 500° C. A hydrocarbon group on the surface of the first soft magnetic particles is decomposed, for example, by heating at 500° C., and a type of alkane corresponding to the length of the straight-chain moiety can be detected by GC-MS.

Evaluation of Lubricity

The lubricity of each of 10 g of the first soft magnetic particles and 10 g of the second soft magnetic particles was evaluated with a lower cell direct driven single shear test apparatus (a powder layer shear force measuring apparatus NS-S500 manufactured by Nano Seeds Corporation). The inner diameter of an upper cell (ring) and a lower cell (base) was set to 15 mm, and the indentation load was set to 150 N. Table 1 shows the results.

Measurement of Relative Permeability

The magnetic characteristics of the toroidal ring were evaluated with an Agilent E4991A RF impedance analyzer. The relative permeability of the toroidal ring was measured at 1 MHz. Table 1 shows the results.

Measurement of Density

The density of the toroidal ring was measured using Archimedes' principle. Table 1 shows the results. The density of the toroidal ring is a measure for evaluating the filling rate of the soft magnetic material. The filling rate of the soft magnetic material increases with the density of the toroidal ring.

Example 2

The C1s peak intensity of the first soft magnetic particles, the lubricity of the first soft magnetic particles and the second soft magnetic particles, and the density and relative permeability of the toroidal ring were measured in the same manner as in Example 1 except that the carbonyl iron powder had an average particle size of 0.5 μm. Table 1 shows the results.

Example 3

The C1s peak intensity of the first soft magnetic particles, the lubricity of the first soft magnetic particles and the second soft magnetic particles, and the density and relative permeability of the toroidal ring were measured in the same manner as in Example 1 except that the carbonyl iron powder had an average particle size of 10 μm. Table 1 shows the results.

Example 4

The C1s peak intensity of the first soft magnetic particles, the lubricity of the first soft magnetic particles and the second soft magnetic particles, and the density and relative permeability of the toroidal ring were measured in the same manner as in Example 1 except that the first soft magnetic particle content was 5% by weight of the total weight of the first soft magnetic particles and the second soft magnetic particles. Table 1 shows the results.

Example 5

The C1s peak intensity of the first soft magnetic particles, the lubricity of the first soft magnetic particles and the second soft magnetic particles, and the density and relative permeability of the toroidal ring were measured in the same manner as in Example 1 except that the first soft magnetic particle content was 30% by weight of the total weight of the first soft magnetic particles and the second soft magnetic particles. Table 1 shows the results.

Example 6

The C1s peak intensity of the first soft magnetic particles, the lubricity of the first soft magnetic particles and the second soft magnetic particles, and the density and relative permeability of the toroidal ring were measured in the same manner as in Example 1 except that the first soft magnetic particle content was 4% by weight of the total weight of the first soft magnetic particles and the second soft magnetic particles. Table 1 shows the results.

Example 7

The C1s peak intensity of the first soft magnetic particles, the lubricity of the first soft magnetic particles and the second soft magnetic particles, and the density and relative permeability of the toroidal ring were measured in the same manner as in Example 1 except that the first soft magnetic particle content was 32% by weight of the total weight of the first soft magnetic particles and the second soft magnetic particles. Table 1 shows the results.

Example 8

The C1s peak intensity of the first soft magnetic particles, the lubricity of the first soft magnetic particles and the second soft magnetic particles, and the density and relative permeability of the toroidal ring were measured in the same manner as in Example 1 except that the second soft magnetic particles had an average particle size of 20 μm. Table 1 shows the results.

Example 9

The C1s peak intensity of the first soft magnetic particles, the lubricity of the first soft magnetic particles and the second soft magnetic particles, and the density and relative permeability of the toroidal ring were measured in the same manner as in Example 1 except that the second soft magnetic particles had an average particle size of 50 μm. Table 1 shows the results.

Example 10

The C1s peak intensity of the first soft magnetic particles, the lubricity of the first soft magnetic particles and the second soft magnetic particles, and the density and relative permeability of the toroidal ring were measured in the same manner as in Example 1 except that the second soft magnetic particles had an average particle size of 19 μm. Table 1 shows the results.

Example 11

The C1s peak intensity of the first soft magnetic particles, the lubricity of the first soft magnetic particles and the second soft magnetic particles, and the density and relative permeability of the toroidal ring were measured in the same manner as in Example 1 except that octyltrimethoxysilane (OTMS, the number of carbon atoms in the straight-chain moiety: 8) was used as a surface-treating agent. Table 1 shows the results.

Example 12

The C1s peak intensity of the first soft magnetic particles, the lubricity of the first soft magnetic particles and the second soft magnetic particles, and the density and relative permeability of the toroidal ring were measured in the same manner as in Example 1 except that octadecyltrimethoxysilane (ODTMS, the number of carbon atoms in the straight-chain moiety: 18) was used as a surface-treating agent. Table 1 shows the results.

Example 13

The C1s peak intensity of the first soft magnetic particles, the lubricity of the first soft magnetic particles and the second soft magnetic particles, and the density and relative permeability of the toroidal ring were measured in the same manner as in Example 1 except that trimethoxy(1-phenyldecyl)silane (TMPDS, the number of carbon atoms in the straight-chain moiety: 10) was used as a surface-treating agent. Table 1 shows the results.

Example 14

The C1s peak intensity of the first soft magnetic particles, the lubricity of the first soft magnetic particles and the second soft magnetic particles, and the density and relative permeability of the toroidal ring were measured in the same manner as in Example 1 except that the first soft magnetic particles were produced by stirring 50 g of a carbonyl iron powder with an average particle size of 1.5 μm (without an insulating film on the surface) in 25 g of ethanol, adding 0.04 M of a surface-treating agent lauric acid (LA, the number of carbon atoms in the straight-chain moiety: 11) dropwise to the carbonyl iron powder, and stirring and mixing them. Table 1 shows the results.

Example 15

The C1s peak intensity of the first soft magnetic particles, the lubricity of the first soft magnetic particles and the second soft magnetic particles, and the density and relative permeability of the toroidal ring were measured in the same manner as in Example 14 except that 0.03 M of 1-octadecanethiol (1-ODT, the number of carbon atoms in the straight-chain moiety: 18) used as a surface-treating agent was weighed and added dropwise. Table 1 shows the results.

Example 16

The C1s peak intensity of the first soft magnetic particles, the lubricity of the first soft magnetic particles and the second soft magnetic particles, and the density and relative permeability of the toroidal ring were measured in the same manner as in Example 14 except that 0.03 M of octadecane-1-sulfonic acid (OT-1-SA, the number of carbon atoms in the straight-chain moiety: 18) used as a surface-treating agent was weighed and added dropwise. Table 1 shows the results.

Example 17

The C1s peak intensity of the first soft magnetic particles, the lubricity of the first soft magnetic particles and the second soft magnetic particles, and the density and relative permeability of the toroidal ring were measured in the same manner as in Example 14 except that 0.03 M of 1-dodecylphosphonic acid (1-DDPA, the number of carbon atoms in the straight-chain moiety: 12) used as a surface-treating agent was weighed and added dropwise. Table 1 shows the results.

Comparative Example 1

The C1s peak intensity of the first soft magnetic particles, the lubricity of the first soft magnetic particles and the second soft magnetic particles, and the density and relative permeability of the toroidal ring were measured in the same manner as in Example 1 except that a carbonyl iron powder with an average particle size of 1.5 μm (without an insulating film on the surface) was directly used (without treatment with a surface-treating agent) as first soft magnetic particles. Table 1 shows the results.

Comparative Example 2

The C1s peak intensity of the first soft magnetic particles, the lubricity of the first soft magnetic particles and the second soft magnetic particles, and the density and relative permeability of the toroidal ring were measured in the same manner as in Example 1 except that the carbonyl iron powder had an average particle size of 0.3 μm. Table 1 shows the results.

Comparative Example 3

The C1s peak intensity of the first soft magnetic particles, the lubricity of the first soft magnetic particles and the second soft magnetic particles, and the density and relative permeability of the toroidal ring were measured in the same manner as in Example 1 except that the second soft magnetic particles had an average particle size of 0.5 μm. Table 1 shows the results.

Comparative Example 4

The C1s peak intensity of the first soft magnetic particles, the lubricity of the first soft magnetic particles and the second soft magnetic particles, and the density and relative permeability of the toroidal ring were measured in the same manner as in Example 1 except that the carbonyl iron powder had an average particle size of 10 μm, the second soft magnetic particles had an average particle size of 1.5 μm, and the first soft magnetic particle content was 80% by weight of the total weight of the first soft magnetic particles and the second soft magnetic particles. Table 1 shows the results.

Comparative Example 5

The C1s peak intensity of the first soft magnetic particles, the lubricity of the first soft magnetic particles and the second soft magnetic particles, and the density and relative permeability of the toroidal ring were measured in the same manner as in Example 1 except that the carbonyl iron powder had an average particle size of 15 μm. Table 1 shows the results.

Comparative Example 6

The C1s peak intensity of the first soft magnetic particles, the lubricity of the first soft magnetic particles and the second soft magnetic particles, and the density and relative permeability of the toroidal ring were measured in the same manner as in Example 1 except that 3-glycidyloxypropyltrimethoxysilane (3-GOPTMS, the number of carbon atoms in the straight-chain moiety: 3) was used as a surface-treating agent. Table 1 shows the results.

Comparative Example 7

The C1s peak intensity of the first soft magnetic particles, the lubricity of the first soft magnetic particles and the second soft magnetic particles, and the density and relative permeability of the toroidal ring were measured in the same manner as in Example 1 except that pentyltrimethoxysilane (PTMS, the number of carbon atoms in the straight-chain moiety: 5) was used as a surface-treating agent. Table 1 shows the results.

TABLE 1

| | First soft magnetic particle | | | | | Second soft magnetic particle | | | | |
|---|---|---|---|---|---|---|---|---|---|---|
| | Surface-treating agent | Particle size (μm) | Amount (wt %) | Lubricity (%/mm) | C1s (c/s) | Particle size (μm) | Amount (wt %) | Lubricity (%/mm) | Density (g/cm$^3$) | Relative permeability (—) |
| Example 1 | HDTMS | 1.5 | 20 | 3.5 | 3000 | 30 | 80 | 1.5 | 6.22 | 35 |
| Example 2 | HDTMS | 0.5 | 20 | 4.0 | 3200 | 30 | 80 | 1.5 | 6.18 | 34 |
| Example 3 | HDTMS | 10 | 20 | 2.5 | 3000 | 30 | 80 | 1.5 | 6.03 | 30 |
| Example 4 | HDTMS | 1.5 | 5 | 3.5 | 3000 | 30 | 95 | 1.5 | 6.11 | 32 |
| Example 5 | HDTMS | 1.5 | 30 | 3.5 | 3000 | 30 | 70 | 1.5 | 6.14 | 33 |
| Example 6 | HDTMS | 1.5 | 4 | 3.5 | 3000 | 30 | 96 | 1.5 | 5.99 | 29 |
| Example 7 | HDTMS | 1.5 | 32 | 3.5 | 3000 | 30 | 68 | 1.5 | 5.99 | 29 |
| Example 8 | HDTMS | 1.5 | 20 | 3.5 | 3000 | 20 | 80 | 1.8 | 6.03 | 30 |
| Example 9 | HDTMS | 1.5 | 20 | 3.5 | 3000 | 50 | 80 | 0.9 | 6.22 | 35 |
| Example 10 | HDTMS | 1.5 | 20 | 3.5 | 3000 | 19 | 80 | 1.8 | 5.99 | 29 |
| Example 11 | OTMS | 1.5 | 20 | 3.0 | 1800 | 30 | 80 | 1.5 | 6.11 | 32 |
| Example 12 | ODTMS | 1.5 | 20 | 3.5 | 3500 | 30 | 80 | 1.5 | 6.22 | 35 |
| Example 13 | TMPDS | 1.5 | 20 | 2.0 | 2000 | 30 | 80 | 1.5 | 6.03 | 30 |
| Example 14 | LA | 1.5 | 20 | 3.4 | 2500 | 30 | 80 | 1.5 | 6.18 | 34 |
| Example 15 | 1-ODT | 1.5 | 20 | 3.3 | 3490 | 30 | 80 | 1.5 | 6.14 | 33 |
| Example 16 | OT-1-SA | 1.5 | 20 | 3.3 | 3500 | 30 | 80 | 1.5 | 6.14 | 33 |
| Example 17 | 1-DDPA | 1.5 | 20 | 3.0 | 2480 | 30 | 80 | 1.5 | 6.11 | 32 |
| Comparative example 1 | — | 1.5 | 20 | 1.1 | 800 | 30 | 80 | 1.5 | 5.66 | 20 |
| Comparative example 2 | HDTMS | 0.3 | 20 | 2.5 | 2500 | 30 | 80 | 1.5 | 5.62 | 19 |
| Comparative example 3 | HDTMS | 1.5 | 20 | 3.5 | 3000 | 0.5 | 80 | 1.5 | 5.62 | 19 |
| Comparative example 4 | HDTMS | 10 | 80 | 2.5 | 3000 | 1.5 | 20 | 1.1 | 5.66 | 20 |
| Comparative example 5 | HDTMS | 15 | 20 | 2.5 | 3000 | 30 | 80 | 1.5 | 5.84 | 25 |
| Comparative example 6 | 3-GOPTMS | 1.5 | 20 | 0.9 | 800 | 30 | 80 | 1.5 | 5.62 | 19 |
| Comparative example 7 | PTMS | 1.5 | 20 | 1.5 | 1000 | 30 | 80 | 1.5 | 5.77 | 23 |

Table 1 shows that the soft magnetic materials according to Examples 1 to 17 had a high density of 5.99 g/cm$^3$ or more and a high relative permeability of 29 or more. This is probably because the first soft magnetic particles had a high lubricity value of 2.0%/mm or more, and the first soft magnetic particles were effectively dispersed between the second soft magnetic particles. The soft magnetic materials preferably had a density of 6.03 g/cm$^3$ or more. The soft magnetic material preferably had a relative permeability of 30 or more.

The soft magnetic materials according to Examples 4 and 5, in which the first soft magnetic particles constituted 5% by weight and 30% by weight, respectively, had a higher relative permeability than the soft magnetic materials according to Examples 6 and 7, in which the first soft magnetic particles constituted 4% by weight and 32% by weight, respectively.

The soft magnetic materials according to Examples 8 and 9, in which the second soft magnetic particles had an average particle size of 20 μm and 50 μm, respectively, had a still higher relative permeability than the soft magnetic material according to Example 10, in which the second soft magnetic particles had an average particle size of 19 μm.

A comparison between the soft magnetic material according to Example 1 and the soft magnetic materials according to Examples 11 to 17 shows that a change in the type of surface-treating agent also improved the density and relative permeability of the soft magnetic material.

The soft magnetic material according to Comparative Example 1, in which the carbonyl iron powder not subjected to surface treatment was used as first soft magnetic particles, had a low density of less than 5.99 g/cm$^3$ and a low relative permeability of less than 29. This is probably because the first soft magnetic particles had a low lubricity value of less than 2.0%/mm. The first soft magnetic particles (small particles) with low lubricity are difficult to disperse between the second soft magnetic particles (large particles) while forming and result in the soft magnetic particles with a low filling rate. This results in the soft magnetic material with a low relative permeability.

The soft magnetic material according to Comparative Example 2, in which the first soft magnetic particles had an average particle size of less than 0.5 μm, had a low density of less than 5.99 g/cm$^3$ and a low relative permeability of less than 29. This is probably because the first soft magnetic particles (small particles) were oxidized and coagulated in the atmospheric and became difficult to disperse between the second soft magnetic particles (large particles) while forming, and the soft magnetic material had a low filling rate.

The soft magnetic materials according to Comparative Examples 3 and 4, in which the first soft magnetic particles had a larger average particle size than the second soft magnetic particles, had a low density of less than 5.99 g/cm$^3$ and a low relative permeability of less than 29. This is probably because the first soft magnetic particles (small particles) became difficult to disperse between the second soft magnetic particles (large particles) while forming, and the soft magnetic material had a low filling rate.

The soft magnetic material according to Comparative Example 5, in which the first soft magnetic particles had an average particle size of more than 10 μm, had a low density of less than 5.99 g/cm$^3$ and a low relative permeability of less than 29. This is probably because the first soft magnetic particles (small particles) became difficult to disperse between the second soft magnetic particles (large particles) while forming, and the soft magnetic material had a low filling rate.

The soft magnetic material according to Comparative Example 6, in which the first soft magnetic particles had no nonpolar hydrocarbon group on the surface, had a low density of less than 5.99 g/cm$^3$ and a low relative permeability of less than 29. This is probably because the first soft magnetic particles had a low lubricity value of less than 2.0%/mm. The first soft magnetic particles (small particles) with low lubricity are difficult to disperse between the second soft magnetic particles (large particles) while forming and result in the soft magnetic particles with a low filling rate. This results in the soft magnetic material with a low relative permeability.

The soft magnetic material according to Comparative Example 7, in which pentyltrimethoxysilane with a straight-chain moiety having 5 carbon atoms was used as a surface-treating agent, had a low density of less than 5.99 g/cm$^3$ and a low relative permeability of less than 29. This is probably because the first soft magnetic particles had a low lubricity value of less than 2.0%/mm. The first soft magnetic particles (small particles) with low lubricity are difficult to disperse between the second soft magnetic particles (large particles) while forming and result in the soft magnetic particles with a low filling rate. This results in the soft magnetic material with a low relative permeability.

The present disclosure includes the following aspects but is not limited to these aspects.

Aspect 1

A soft magnetic material containing first soft magnetic particles; and second soft magnetic particles with a larger average particle size than the first soft magnetic particles. The first soft magnetic particles have an average particle size in the range of 0.5 to 10 μm, and the first soft magnetic particles have a nonpolar hydrocarbon group on their surfaces.

Aspect 2

A soft magnetic material containing first soft magnetic particles; and second soft magnetic particles with a larger average particle size than the first soft magnetic particles. The first soft magnetic particles have an average particle size in the range of 0.5 to 10 μm, and the first soft magnetic particles have a hydrocarbon group with a straight-chain moiety having 6 or more carbon atoms on their surfaces.

Aspect 3

A soft magnetic material containing first soft magnetic particles; and second soft magnetic particles with a larger average particle size than the first soft magnetic particles. The first soft magnetic particles have an average particle size in the range of 0.5 to 10 μm, and the first soft magnetic particles have a lubricity value of 2.0%/mm or more, the lubricity value being represented by the following formula.

Percentage of stress relaxation (%)=(Maximum indentation load−Indentation load at the beginning of lateral sliding)/Maximum indentation load×100

Lubricity (%/mm)=Percentage of stress relaxation (%)/Final powder layer thickness (mm) [Math. 1]

Aspect 4

The soft magnetic material according to Aspect 1 or 2, wherein the first soft magnetic particles have a lubricity value of 2.0%/mm or more, the lubricity value being represented by the following formula.

Percentage of stress relaxation (%)=(Maximum indentation load−Indentation load at the beginning of lateral sliding)/Maximum indentation load×100

Lubricity (%/mm)=Percentage of stress relaxation (%)/Final powder layer thickness (mm) [Math. 2]

Aspect 5

The soft magnetic material according to any one of Aspects 1 to 4, wherein the second soft magnetic particles have a lubricity value of less than 2.0%/mm, the lubricity value being represented by the following formula.

Percentage of stress relaxation (%)=(Maximum indentation load−Indentation load at the beginning of lateral sliding)/Maximum indentation load×100

Lubricity (%/mm)=Percentage of stress relaxation (%)/Final powder layer thickness (mm) [Math. 3]

Aspect 6

The soft magnetic material according to any one of Aspects 1 to 5, wherein the first soft magnetic particles in the soft magnetic material constitute 5% to 30% by weight of the total weight of the soft magnetic particles.

Aspect 7

The soft magnetic material according to any one of Aspects 1 to 6, wherein the second soft magnetic particles have an average particle size in the range of 20 to 50 μm.

Aspect 8

The soft magnetic material according to any one of Aspects 1 to 7, further containing a binder.

Aspect 9

The soft magnetic material according to Aspect 8, wherein the binder has a polar group.

Aspect 10

The soft magnetic material according to Aspect 8 or 9, wherein the binder is a thermosetting resin.

Aspect 11

The soft magnetic material according to Aspect 10, wherein the thermosetting resin is an epoxy resin.

Aspect 12

The soft magnetic material according to any one of Aspects 1 to 11, wherein the first soft magnetic particles and the second soft magnetic particles are magnetic metal particles.

Aspect 13

A green compact containing the soft magnetic material according to any one of Aspects 1 to 12.

A soft magnetic material according to the present disclosure can provide soft magnetic particles with a higher filling rate and is suitable for electronic components that require good magnetic characteristics.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A soft magnetic material comprising:

first soft magnetic particles; and second soft magnetic particles having a larger average particle size than the first soft magnetic particles, wherein the first soft magnetic particles have an average particle size in a range of 0.5 to 10 μm, the first soft magnetic particles have a nonpolar hydrocarbon group on their surfaces, and the first soft magnetic particles in the soft magnetic material constitute 5% to 50% by weight of the total weight of the soft magnetic particles, the first soft magnetic particles have a lubricity value of 2.5%/mm or more, the second soft magnetic particles have a lubricity value of less than 2.0%/mm, the lubricity value being represented by the following formula, Percentage of stress relaxation (%)=(Maximum indentation load−Indentation load at the beginning of lateral sliding)/Maximum indentation load×100; and Lubricity (%/mm)=Percentage of stress relaxation (%)/Final powder layer thickness (mm).

2. The soft magnetic material according to claim 1, wherein the second soft magnetic particles have an average particle size in a range of 20 to 50 μm.

3. The soft magnetic material according to claim 1, further comprising:

a binder.

4. The soft magnetic material according to claim 3, wherein the binder has a polar group.

5. The soft magnetic material according to claim 3, wherein the binder is a thermosetting resin.

6. The soft magnetic material according to claim 5, wherein the thermosetting resin is an epoxy resin.

7. The soft magnetic material according to claim 1, wherein the first soft magnetic particles and the second soft magnetic particles are magnetic metal particles.

8. A green compact comprising the soft magnetic material according to claim 1.

9. The soft magnetic material according to claim 1, wherein the first soft magnetic particles have an average particle size in a range of 0.5 to 1.5 μm.

10. A soft magnetic material comprising:

first soft magnetic particles; and second soft magnetic particles having a larger average particle size than the first soft magnetic particles, wherein the first soft magnetic particles have an average particle size in a range of 0.5 to 10 μm, and the first soft magnetic particles have a hydrocarbon group with a straight-chain moiety having 6 or more carbon atoms on their surfaces, the first soft magnetic particles have a lubricity value of 2.5%/mm or more, the second soft magnetic particles have a lubricity value of less than 2.0%/mm, the lubricity value being represented by the following formula, Percentage of stress relaxation (%)=(Maximum indentation load−Indentation load at the beginning of lateral sliding)/Maximum indentation load×100; and Lubricity (%/mm)=Percentage of stress relaxation (%)/Final powder layer thickness (mm).

11. The soft magnetic material according to claim 10, wherein the first soft magnetic particles in the soft magnetic material constitute 5% to 50% by weight of the total weight of the soft magnetic particles.

12. The soft magnetic material according to claim 10, wherein the second soft magnetic particles have an average particle size in a range of 20 to 50 μm.

13. The soft magnetic material according to claim 10, wherein the first soft magnetic particles have an average particle size in a range of 0.5 to 1.5 μm.

14. A soft magnetic material comprising:

first soft magnetic particles; and second soft magnetic particles having a larger average particle size than the first soft magnetic particles, wherein the first soft magnetic particles have an average particle size in a range of 0.5 to 10 μm, and the first soft magnetic particles have a lubricity value of 2.5%/mm or more, the second soft magnetic particles have a lubricity value of less than 2.0%/mm, the lubricity value being represented by the following formula Percentage of stress relaxation (%)=(Maximum indentation load−Indentation load at the beginning of lateral sliding)/Maximum indentation load×100; and Lubricity (%/mm)=Percentage of stress relaxation (%)/Final powder layer thickness (mm), and the first soft magnetic particles in the soft magnetic material constitute 5% to 50% by weight of the total weight of the soft magnetic particles.

15. The soft magnetic material according to claim 14, wherein the second soft magnetic particles have an average particle size in a range of 20 to 50 μm.

* * * * *